United States Patent
Ito et al.

(10) Patent No.: US 11,566,914 B2
(45) Date of Patent: Jan. 31, 2023

(54) INFORMATION PROVIDING APPARATUS, INFORMATION PROVIDING SYSTEM, AND NON-TRANSITORY COMPUTER READABLE MEDIUM STORING PROGRAM

(71) Applicant: FUJIFILM Business Innovation Corp., Tokyo (JP)

(72) Inventors: Yasuhiro Ito, Kanagawa (JP); Junko Murakami, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 183 days.

(21) Appl. No.: 16/352,863

(22) Filed: Mar. 14, 2019

(65) Prior Publication Data

US 2019/0346277 A1    Nov. 14, 2019

(30) Foreign Application Priority Data

May 8, 2018   (JP) .............................. JP2018-089674

(51) Int. Cl.
*G01C 21/36* (2006.01)
*G01C 21/32* (2006.01)
*G06K 9/00* (2006.01)
*G06V 30/422* (2022.01)

(52) U.S. Cl.
CPC ......... *G01C 21/3676* (2013.01); *G01C 21/32* (2013.01); *G06V 30/422* (2022.01)

(58) Field of Classification Search
CPC ................ G01C 21/3676; G01C 21/32; G01C 21/3626; G06K 9/00476
See application file for complete search history.

(56) References Cited

U.S. PATENT DOCUMENTS

| | | | |
|---|---|---|---|
| 2005/0204448 A1 | 9/2005 | Wise et al. | |
| 2012/0223968 A1* | 9/2012 | Kashimoto | G06T 19/006 345/633 |
| 2013/0169681 A1* | 7/2013 | Rasane | G06Q 50/10 345/633 |
| 2013/0211814 A1* | 8/2013 | Derks | G06Q 50/12 704/2 |

(Continued)

FOREIGN PATENT DOCUMENTS

| | | |
|---|---|---|
| JP | H05100619 | 4/1993 |
| JP | H071970 | 1/1995 |

(Continued)

OTHER PUBLICATIONS

English translation JP2018063607A.*
"Office Action of Japan Counterpart Application", dated Feb. 1, 2022, with English translation thereof, p. 1-p. 5.

*Primary Examiner* — Rami Khatib
(74) *Attorney, Agent, or Firm* — JCIPRNET (57) ABSTRACT

An information providing apparatus includes an acquisition section that acquires position information from a terminal device, a specifying section that specifies a target publication from plural publications on which maps have been posted, by performing processing with the position information, and a providing section that provides the terminal device with information indicating a correspondence relationship between a map posted on the target publication and a position indicated by the position information.

11 Claims, 7 Drawing Sheets

(56) References Cited

U.S. PATENT DOCUMENTS

| | | | |
|---|---|---|---|
| 2015/0163260 A1* | 6/2015 | Dayan | H04L 51/046 709/206 |
| 2017/0090441 A1* | 3/2017 | Schmitt | G05B 15/02 |
| 2019/0087078 A1* | 3/2019 | Norton | G08B 29/145 |

FOREIGN PATENT DOCUMENTS

| | | | |
|---|---|---|---|
| JP | H0843111 | | 2/1996 |
| JP | H09210717 | | 8/1997 |
| JP | 2003168179 | | 6/2003 |
| JP | 2004264108 | | 9/2004 |
| JP | 2007529643 | | 10/2007 |
| JP | 2012059601 | | 3/2012 |
| JP | 2013195095 | | 9/2013 |
| JP | 2018063607 A | * | 4/2018 |
| WO | 2007018305 | | 2/2007 |

\* cited by examiner

FIG. 3

<CURRENT POSITION>

| IDENTIFICATION NUMBER | PUBLICATION NAME | POST PLACE |
|---|---|---|
| AAAA-000001 | KANTO MAP (BOOK) | P24(A3) |
| BBBB-000002 | KANAGAWA PREFECTURE MAP (BOOK) | P4(D11) |
| CCCC-99999 | YOKOHAMA CITY MAP (BOOK) | P2(M2) |
| P1234 | TOURIST MAP (PAMPHLET) | P3(C3) |

FIG. 4
<POSTED MAP EXAMPLE: KANTO MAP (24TH PAGE)>

FIG. 6

<ROUTE INFORMATION>

| | KANTO MAP (AAAA-000001) | KANAGAWA PREFECTURE MAP (BBBB-000002) | YOKOHAMA CITY MAP (CCCC-99999) |
|---|---|---|---|
| CURRENT POSITION | P24(A3) | P4(D11) | P2(M2) |
| | P24(A4) | P5(A11) | P2(M3) |
| | P23(A19) | P5(A10) | P2(M4) |
| | P23(B19) | P5(A9) | P2(N4) |
| | P23(C19) | P5(A8) | P2(N5) |
| DESTINATION | SECOND PUBLIC HALL | B CITY HALL | EMBASSY OF GERMANY |

FIG. 7

<USER INFORMATION>

| USE LANGUAGE | GERMAN |
|---|---|
| POSITION INFORMATION | 35.4633, 139.6277 |
| TRANSLATION TIME POINT | 2/21/2018 12:00AM |

<LANGUAGE-RELATED FACILITY INFORMATION>

|  | KANTO MAP (AAAA-000001) | KANAGAWA PREFECTURE MAP (BBBB-000002) |
|---|---|---|
| GERMAN RESTAURANT | P23(K14) | P7(B3) |
| GERMAN LANGUAGE SCHOOL | P23(B13) | P7(D3) |
| EMBASSY OF GERMANY | P23(A17) | P8(C7) |

<SURROUNDING FACILITY INFORMATION>

| FACILITY NAME | FIRST BOOK STORE |
|---|---|
| POSITION INFORMATION | 35.4633, 139.6277 | though
INFORMATION PROVIDING APPARATUS, INFORMATION PROVIDING SYSTEM, AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2018-089674 filed May 8, 2018.

BACKGROUND

(i) Technical Field

The present invention relates to an information providing apparatus, an information providing system, and a non-transitory computer readable medium storing a program.

(ii) Related Art

JP1995-071970A discloses an apparatus that calculates a latitude and a longitude of a reception point from data superimposed on a radio wave from a GPS satellite and calculates a page number of a map book including the reception point.

The pamphlet of WO2007/018305A discloses a system as follows. A shelter is specified based on position information of a user using terminal, and a route which is allowed to travel and has the shortest distance is determined among routes from the current position of the user to the shelter, as an evacuation route. Information obtained by combining the evacuation route with map information and guidance information indicating, for example, a direction in which the user is to move are transmitted to the user using terminal.

JP2003-168179A discloses a real-time hazard map system in which real-time information is distributed under various flooding situations changing with time.

JP2013-195095A discloses an apparatus that generates evacuation route information regarding an evacuation route which does not pass on a place indicated by damaged-area information and outputs map information and the evacuation route information.

SUMMARY

For example, in an unfamiliar place such as a travel destination, it may be desired to use not only a map displayed in a terminal device such as a smart phone, but also a map posted on a publication such as a book or a pamphlet.

Aspects of non-limiting embodiments of the present disclosure relate to an information providing apparatus, an information providing system, and a non-transitory computer readable medium storing a program, in which correspondence relationship between a map posted on a target publication specified using position information of a terminal device and a position indicated by the position information is recognized.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided on information providing apparatus which includes an acquisition section that acquires position information from a terminal device, a specifying section that specifies a target publication from a plurality of publications on which maps have been posted, by performing processing with the position information, and a providing section that provides the terminal device with information indicating a correspondence relationship between a map posted on the target publication and a position indicated by the position information.

BRIEF DESCRIPTION OF THE DRAWINGS

Exemplary embodiment(s) of the present invention will be described in detail based on the following figures, wherein.

DETAILED DESCRIPTION

Figure 1:
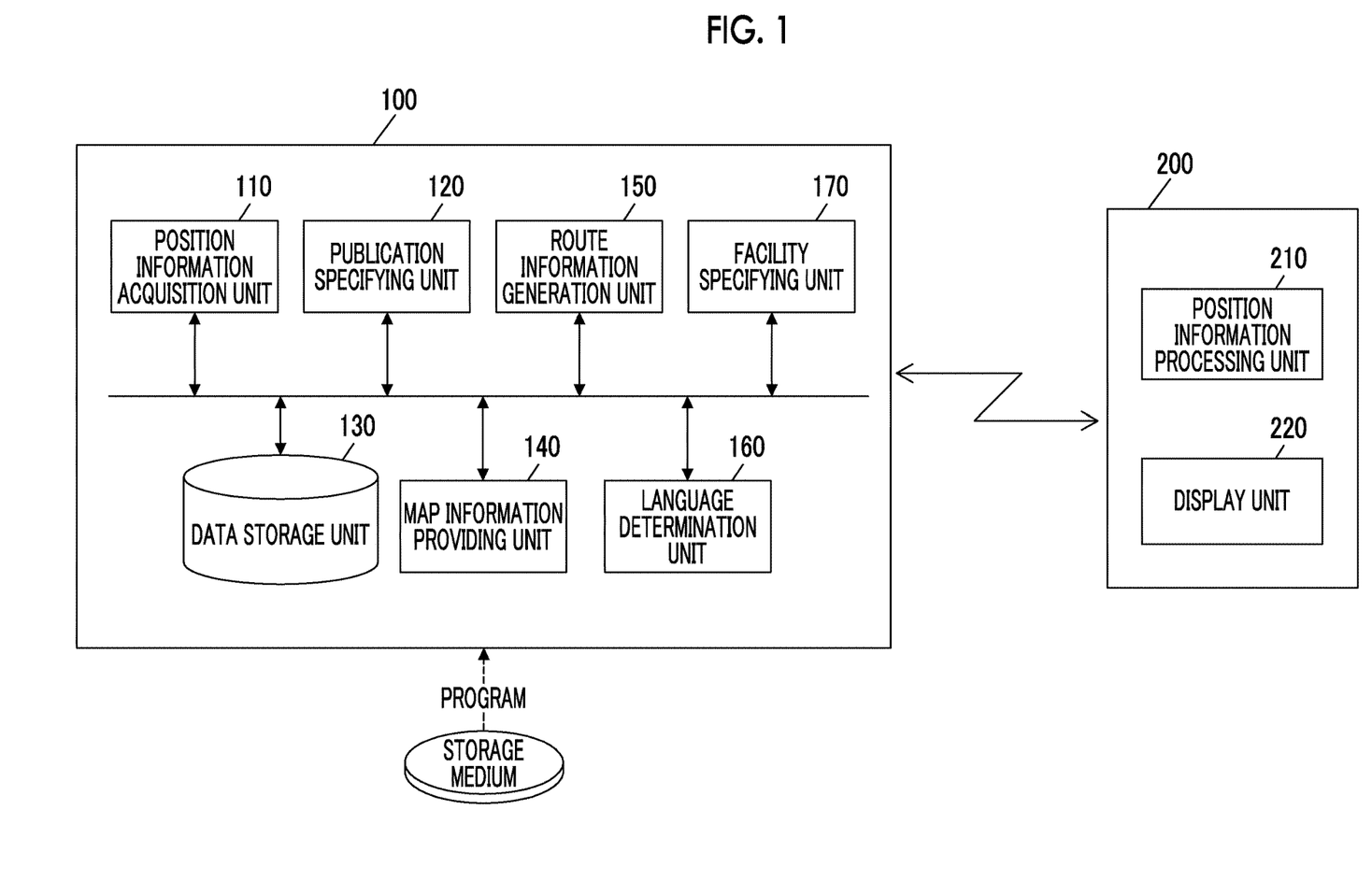
FIG. 1 is a diagram illustrating a specific example of an information providing system.

FIG. 1 is a diagram illustrating an example of a specific exemplary embodiment of the present invention. FIG. 1 illustrates a specific example of an information providing system which includes an information providing apparatus 100 and one or more terminal devices 200. The information providing apparatus 100 and the terminal device 200 are connected to each other, for example, via a communication line (communication network) so as to transmit and receive data (information) to and from each other.

The information providing apparatus 100 provides the terminal device 200 with information of a map posted on a publication such as a book or a pamphlet. In the specific example illustrated in FIG. 1, the information providing apparatus 100 includes a position information acquisition unit 110, a publication specifying unit 120, a data storage unit 130, a map information providing unit 140, a route information generation unit 150, a language determination unit 160, and a facility specifying unit 170.

The position information acquisition unit 110 acquires position information from the terminal device 200. The publication specifying unit 120 specifies a target publication from plural publications on which maps have been posted, by performing processing with the position information acquired by the position information acquisition unit 110. For example, the publication specifying unit 120 specifies a target publication satisfying a condition of easy acquisition from plural publications, by comparing a place in which each publication is provided and a position indicated by the position information to each other.

The data storage unit 130 stores information regarding plural publications such as books or pamphlets. The data storage unit 130 also stores various kinds of information used by the information providing apparatus 100. For example, the data storage unit 130 is realized by using a storage device such as a hard disk drive or a semiconductor memory.

The map information providing unit 140 provides the terminal device 200 with information indicating a correspondence relationship between a map posted on the target publication specified by the publication specifying unit 120 and the position indicated by the position information acquired by the position information acquisition unit 110. For example, the map information providing unit 140 provides the terminal device 200 with information as follows: information indicating a post place of the position indicated by the position information on the map of the target publication; route information which sequentially indicates post places corresponding to a route from the position indicated by the position information to a destination on the map of the target publication; and information indicating a post place of a position for a specific facility on the map of the target publication.

The route information generation unit 150 generates information of a route from the position indicated by the position information acquired by the position information acquisition unit 110 to a destination. The language determination unit 160 determines a use language used by a user of the terminal device 200, from at least one of language setting information of the terminal device 200 or use information of a translation service. The facility specifying unit 170 specifies the position of a specific facility corresponding to the use language used by the user of the terminal device 200.

The information providing apparatus 100 in the specific example illustrated in FIG. 1 may be realized by using one or more computers, for example. The computer includes hardware resources, for example, an arithmetic device such as a CPU, a storage device such as a memory or hard disk, a communication device using a communication line such as the Internet, a device that reads and writes data from and in a storage medium such as an optical disk or a semiconductor memory, and a display device such as a display, and an operation device that receives an operation from a user.

For example, the computer reads a program (software) corresponding to a function of at least one of plural components which are provided in the information providing apparatus 100 illustrated in FIG. 1 and are denoted by reference signs. At least a function of the information providing apparatus 100 is realized by the computer, in cooperation with the hardware resources of the computer and the read software. For example, the program may be provided for the computer (information providing apparatus 100) via the communication line such as the Internet. The program may be stored in a storage medium such as an optical disk, a semiconductor memory, or a card memory, and then be provided for the computer (information providing apparatus 100).

The terminal device 200 is a device used by a user of the information providing system illustrated in FIG. 1. A specific example of the terminal device 200 illustrated in FIG. 1 includes a portable information terminal such as a smart phone or a tablet. In a case where the terminal device 200 is a portable information terminal, the terminal device 200 transmits and receives data (information) to and from the information providing apparatus 100 by using a communication line in wireless connection, for example. The terminal device 200 may be an information processing apparatus such as a computer. The terminal device 200 may transmit and receive data (information) to and from the information providing apparatus 100 by using a communication line in wired connection.

In the specific example illustrated in FIG. 1, the terminal device 200 includes a position information processing unit 210 and a display unit 220.

The position information processing unit 210 acquires position information of the terminal device 200. The position information processing unit 210 acquires position information indicating the current position of the terminal device 200, for example, by using a position information service of the GPS. The position information may be information indicating the longitude and the latitude, or be information indicating coordinate values in a reference coordinate system (for example, a coordinate system including a coordinate axis corresponding to the east-west direction and a coordinate axis corresponding to the north-south direction).

The display unit 220 displays information and the like provided from the information providing apparatus 100. For example, the display unit 220 is realized by using a display device such as a display or a touch panel.

The overall configuration of the information providing system illustrated in FIG. 1 is as described above. Next, processing and the like realized by the information providing system in FIG. 1 will be described in detail. Regarding the components (parts having reference signs) illustrated in FIG. 1, the reference signs in FIG. 1 are used in the following descriptions.

Figure 2:
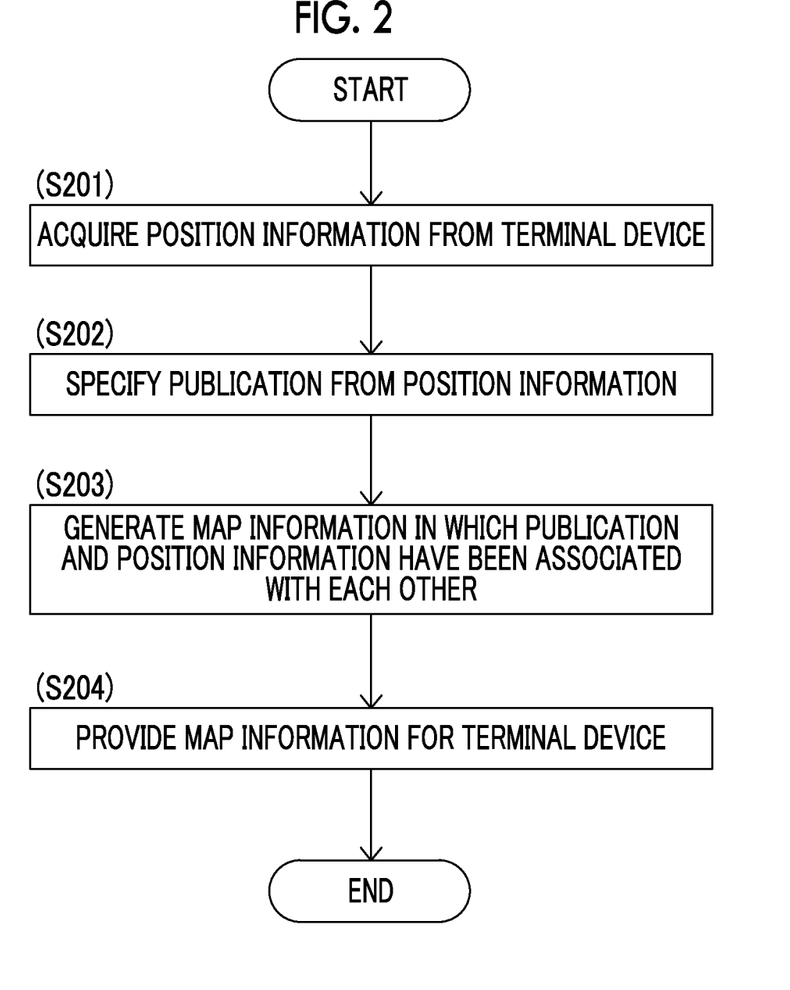
FIG. 2 is a diagram illustrating Specific Example 1 of processing performed by an information providing apparatus.

FIG. 2 is a diagram (flowchart) illustrating Specific Example 1 of processing realized by the information providing apparatus 100. In Specific Example 1 illustrated in FIG. 2, firstly, the position information acquisition unit 110 acquires position information from the terminal device 200 (S201). The position information acquisition unit 110 acquires the position information provided from the terminal device 200 via the communication line, by using a communication device, for example.

Then, the publication specifying unit 120 specifies a target publication from plural publications on which maps have been posted, by performing processing with the position information (S202). For example, the publication specifying unit 120 specifies a publication satisfying a condition of easy acquisition from plural publications, by comparing a place in which each publication is provided and a position indicated by the position information to each other, and sets the specified publications as the target publication.

A specific example of the publication includes a book or a pamphlet. For example, in a case where the publication is a book, the book is provided in a store such as a book store. In a case where the publication is a sightseeing pamphlet, the pamphlet is provided in a facility such as a tourist information office.

For example, the publication specifying unit 120 specifies the target publication with reference to publication-related data in which plural publications and places in which the publications have been provided have been associated with each other. The publication-related data may be stored in the data storage unit 130 in advance. The publication-related data may be provided for the information providing apparatus 100 from an apparatus that provides the publication-related data, via a communication line.

The publication specifying unit 120 specifies a publication satisfying the condition of easy acquisition, from plural publications, and sets the specified publication as the target publication. For example, the publication specifying unit 120 sets a publication in the vicinity of the position indicated by the position information of the terminal device 200, as the target publication. For example, any publication in an order of a distance from the position indicated by the position information of the terminal device 200 being short is specified as the target publication.

The target publication may be specified based on the inventory situation of the publication. For example, the publication specifying unit 120 may set a publication which is in stock in the vicinity of the position indicated by the position information of the terminal device 200 among plural publication, as the target publication by using inventory data indicating the inventory situation of a publication such as a book for each facility such as a book store. The inventory data may be stored in the data storage unit 130 in advance. For example, the inventory data may be provided for the information providing apparatus 100 via the communication line, as a portion of the publication-related data, for example. In a case where the publication is a book, a book with high sales records and high circulation may be preferentially set as the target publication.

In a case where the target publication is specified, map information in which the target publication and the position information have been associated with each other is generated (S203). For example, the map information providing unit 140 generates the map information indicating a post place of a position indicated by the position information, on the map of the target publication. The map information providing unit 140 provides the position information for the terminal device 200 (S204).

Figure 3:
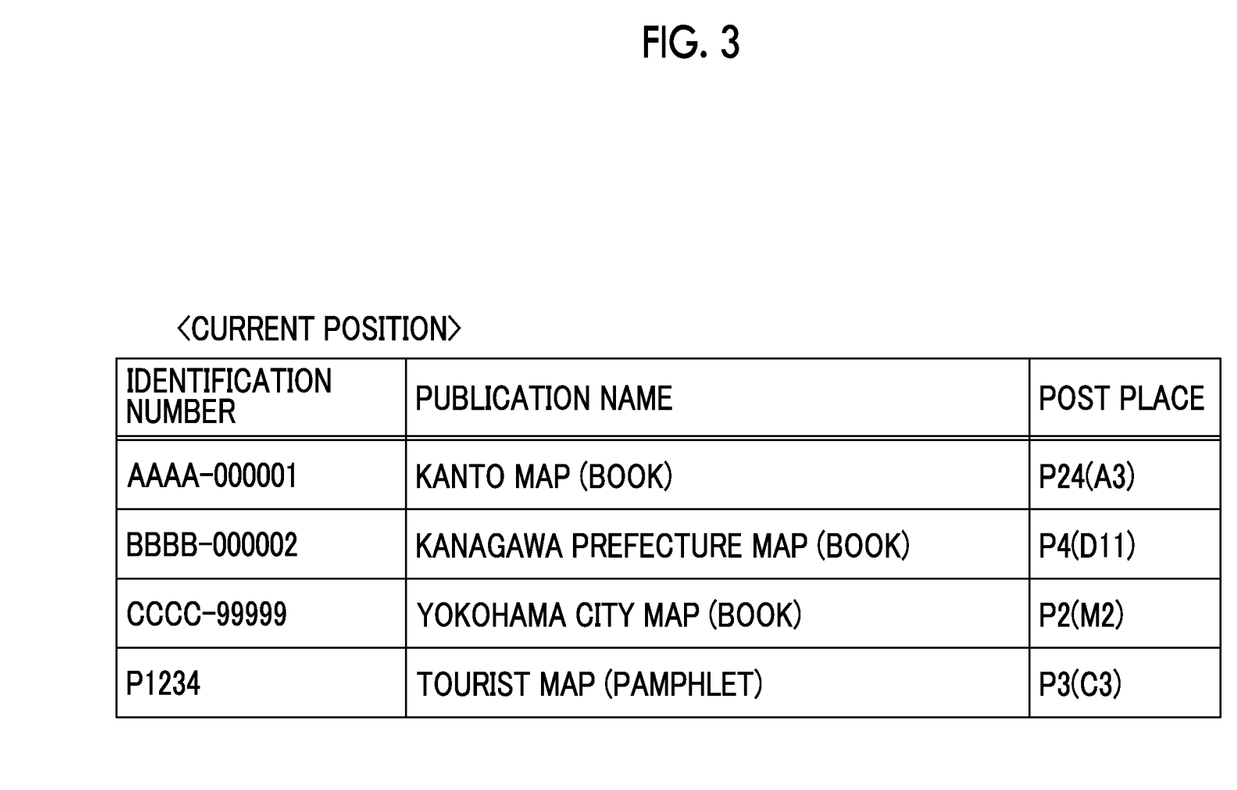
FIG. 3 is a diagram illustrating a specific example of map information.

FIG. 3 is a diagram illustrating a specific example of the map information. FIG. 3 illustrates the specific example of the map information regarding the current position of the user, which is indicated by the position information of the terminal device 200.

An identification number is a number for identifying a publication. For example, in a case where the publication is a book, the international standard book number (ISBN) may be used as the identification number for identifying the book.

The publication name is the name of a publication. For example, in a case where the publication is a book, the book name (title) is the publication name. In a case where the publication is a pamphlet, the name or the like of the pamphlet is the publication name.

The post place is a post place of the position indicated by the position information of the terminal device 200, on the map posted on the publication. In the specific example illustrated in FIG. 3, the post place is indicated by a page on which a map is posted and a section in the page.

For example, in the specific example illustrated in FIG. 3, the position (current position) indicated by the position information acquired from the terminal device 200 is in a section (A3) on a map on the 24th page (P24), which is posted on a book of "Kanto map".

Figure 4:
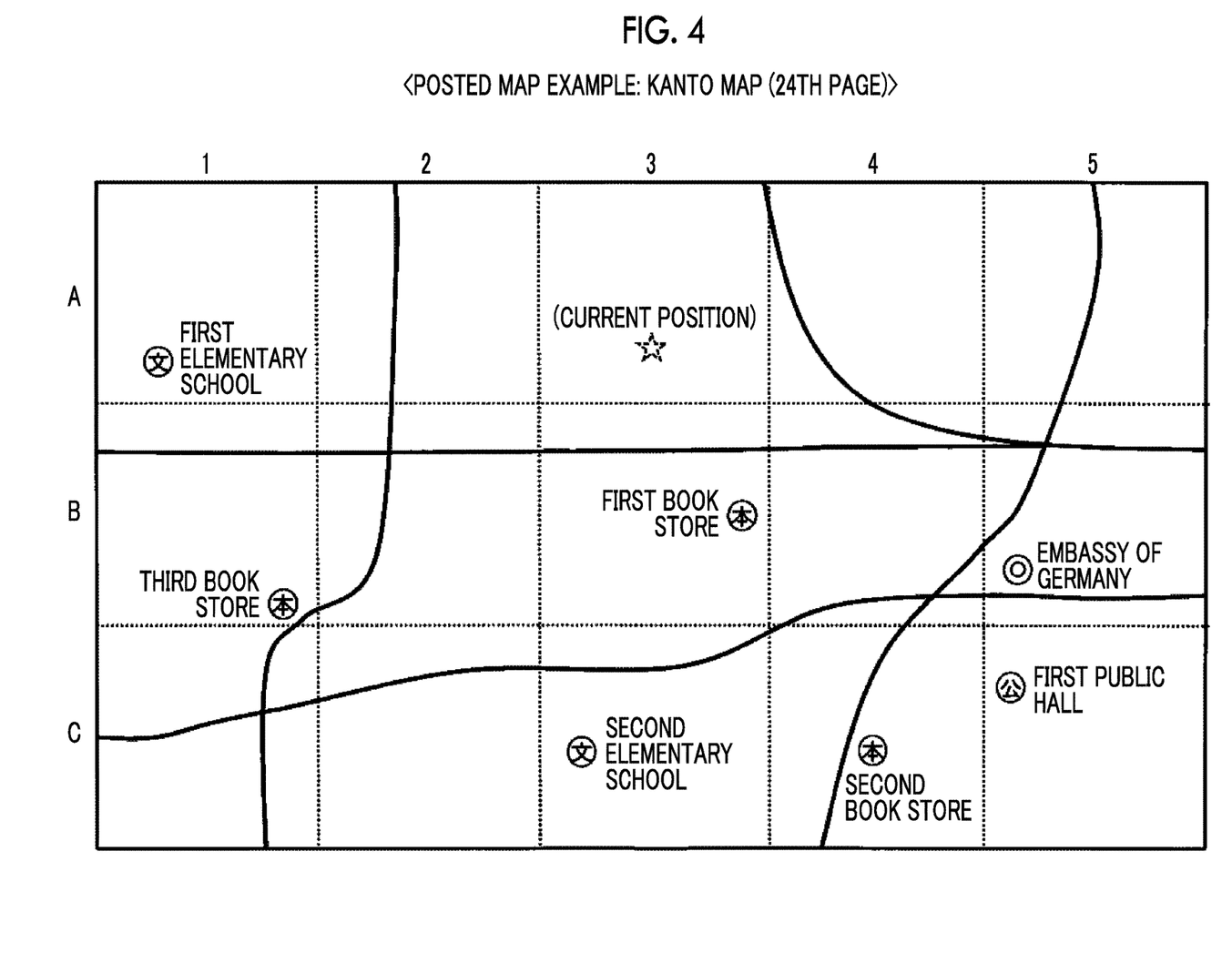
FIG. 4 is a diagram illustrating a specific example of a map posted on a publication.

FIG. 4 illustrates a specific example of a map posted on a publication. FIG. 4 illustrates the specific example of the map posted on the 24th page of the book of "Kanto map (see FIG. 3)".

In the specific example illustrated in FIG. 4, the current position is the position indicated by the position information acquired from the terminal device 200 and is in the section (A3) on the map. Thus, according to the specific example illustrated in FIG. 4, the post place of the current position for "Kanto map" is P24 (A3) as illustrated in FIG. 3.

Information of a range of a position indicated by a map posted on a publication, for example, information of a longitude range and a latitude range for each section on the map may be stored in the data storage unit 130 in advance.

For example, the above information may be provided for the information providing apparatus 100 via the communication line, as a portion of the publication-related data. For example, the information providing apparatus 100 obtains the page and the section corresponding to the current position by comparing data indicating the range of the position indicated by the map posted on the publication and the current position indicated by the position information of the terminal device 200. The information providing apparatus 100 may obtain the page and the section corresponding to the current position indicated by the position information of the terminal device 200, by analyzing electronic data (electronic book or the like) of the publication.

In this manner, for example, in a case where the map information illustrated in FIG. 3 is generated, the generated map information is provided for the terminal device 200 from the map information providing unit 140 and is displayed in the display unit 220 of the terminal device 200. For example, the table illustrated in FIG. 3 may be displayed in the display unit 220, or a display image based on the contents of the table illustrated in FIG. 3 may be displayed.

According to Specific Example 1 described with reference to FIG. 2, the map information (for example, FIG. 3) is provided for the terminal device 200. Thus, for example, even in an unfamiliar place such as a travel destination or a business trip destination, the post place corresponding to the current position of the user on the map posted on the publication such as a book or a pamphlet is easily recognized. For example, even in a case where using a map displayed in the terminal device 200 is not possible due to an occurrence of a disaster or the like, the post place corresponding to the current position of the user on the map posted on the publication such as a book or a pamphlet is easily recognized. Thus, convenience of the map posted on the publication is improved.

Figure 5:
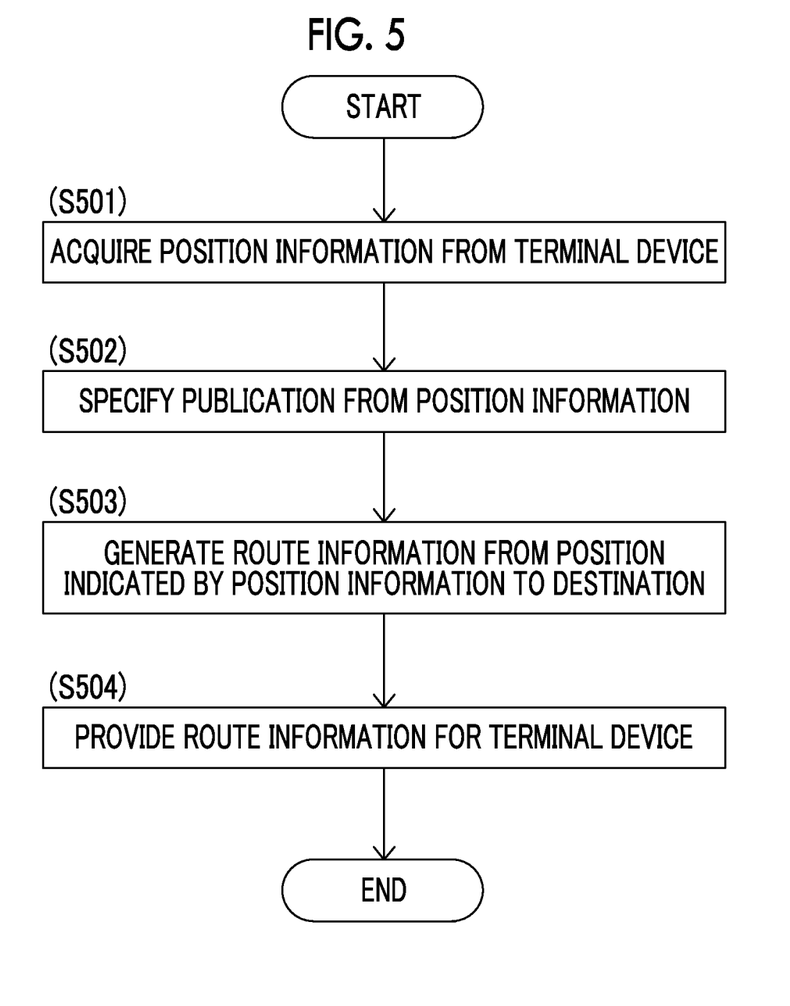
FIG. 5 is a diagram illustrating Specific Example 2 of the processing performed by the information providing apparatus.

FIG. 5 is a diagram (flowchart) illustrating Specific Example 2 of the processing realized by the information providing apparatus 100. In Specific Example 2 illustrated in FIG. 5, firstly, the position information acquisition unit 110 acquires position information from the terminal device 200 (S501). The publication specifying unit 120 specifies a target publication from plural publications on which maps have been posted, by performing processing with the position information (S502). In the steps of S501 and S502, the same processes as the steps of S201 and S202 in, for example, Specific Example 1 (FIG. 2) are performed.

Then, route information indicating a route from the position indicated by the position information of the terminal device 200 to a destination is generated (S503). The destination is determined in accordance with the purpose of using information provided by the information providing apparatus 100. For example, in a case where a disaster occurs, a shelter and the like in the vicinity of the position indicated by the position information of the terminal device 200 are determined as the destination. In a case where the information providing apparatus 100 provides information of a certain event, the place and the like in which the event is held are determined as the destination. The user using the terminal device 200 may designate the destination.

The route information generation unit 150 generates the route information indicating the route from the position indicated by the position information of the terminal device 200 to the destination. For example, route information which sequentially indicates post places corresponding to the route from the position indicated by the position information to the destination, on the map of the target publication, is generated. The map information providing unit 140 provides the route information for the terminal device 200 (S504).

Figure 6:
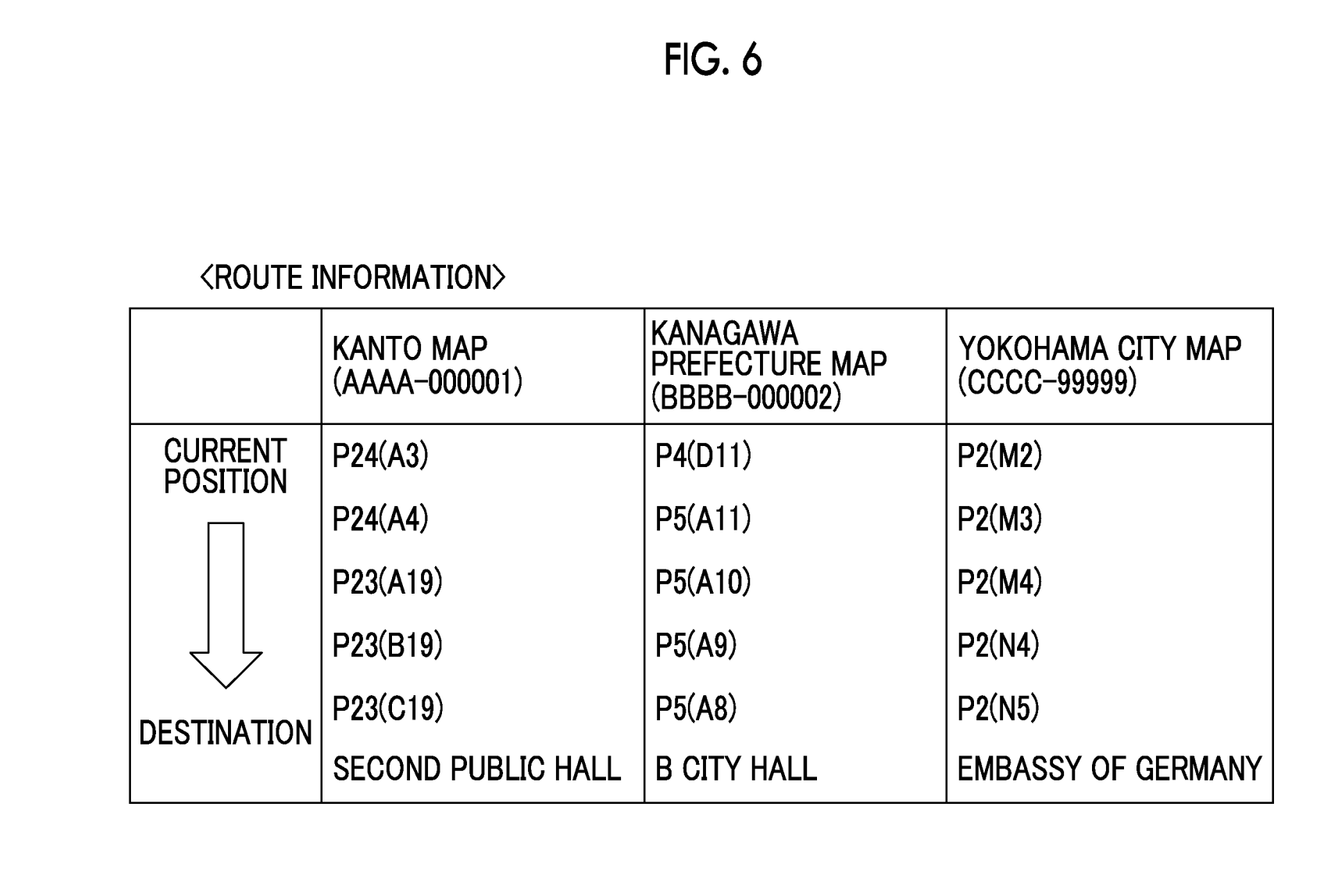
FIG. 6 is a diagram illustrating a specific example of route information.

FIG. 6 is a diagram illustrating a specific example of the route information. FIG. 6 illustrates route information which sequentially indicates post places corresponding to a route from the position indicated by the position information to a destination, for each of "Kanto map", "Kanagawa prefecture map", and "Yokohama city map" (see FIG. 3) which are books specified as target publications.

For example, in the specific example illustrated in FIG. 6, the position (current position) indicated by the position information acquired from the terminal device 200 is in the section (A3) on the map on the 24th page (P24), which is posted on the book of "Kanto map". On the map posted on "Kanto map", post places corresponding to a route to a second public hall as a destination are shown in an order of a section (A4) on the 24th page (P24), a section (A19) on the 23rd page (P23), a section (B19) on the 23rd page (P23), and a section (C19) on the 23rd page (P23) from the section (A3) on the 24th page (P24) as the post place corresponding to the current position.

In the specific example illustrated in FIG. 6, post places corresponding to a route from the current position to the B city hall as the destination are shown on the map posted on "Kanagawa prefecture map", and post places corresponding to a route from the current position to the embassy of Germany as a destination are shown on the map posted on "Yokohama city map".

In this manner, for example, in a case where the route information illustrated in FIG. 6 is generated, the generated route information is provided for the terminal device 200 from the map information providing unit 140 and is displayed in the display unit 220 of the terminal device 200. For example, the table illustrated in FIG. 6 may be displayed in the display unit 220, or a display image based on the contents of the table illustrated in FIG. 6 may be displayed. For example, a display image indicating a list of plural post places corresponding to a route from the current position to a destination may be displayed. Display images which sequentially indicate plural post place one by one may be displayed. A display image including the map information illustrated in FIG. 3 and the route information illustrated in FIG. 6 may be displayed in the display unit 220.

Figure 7:
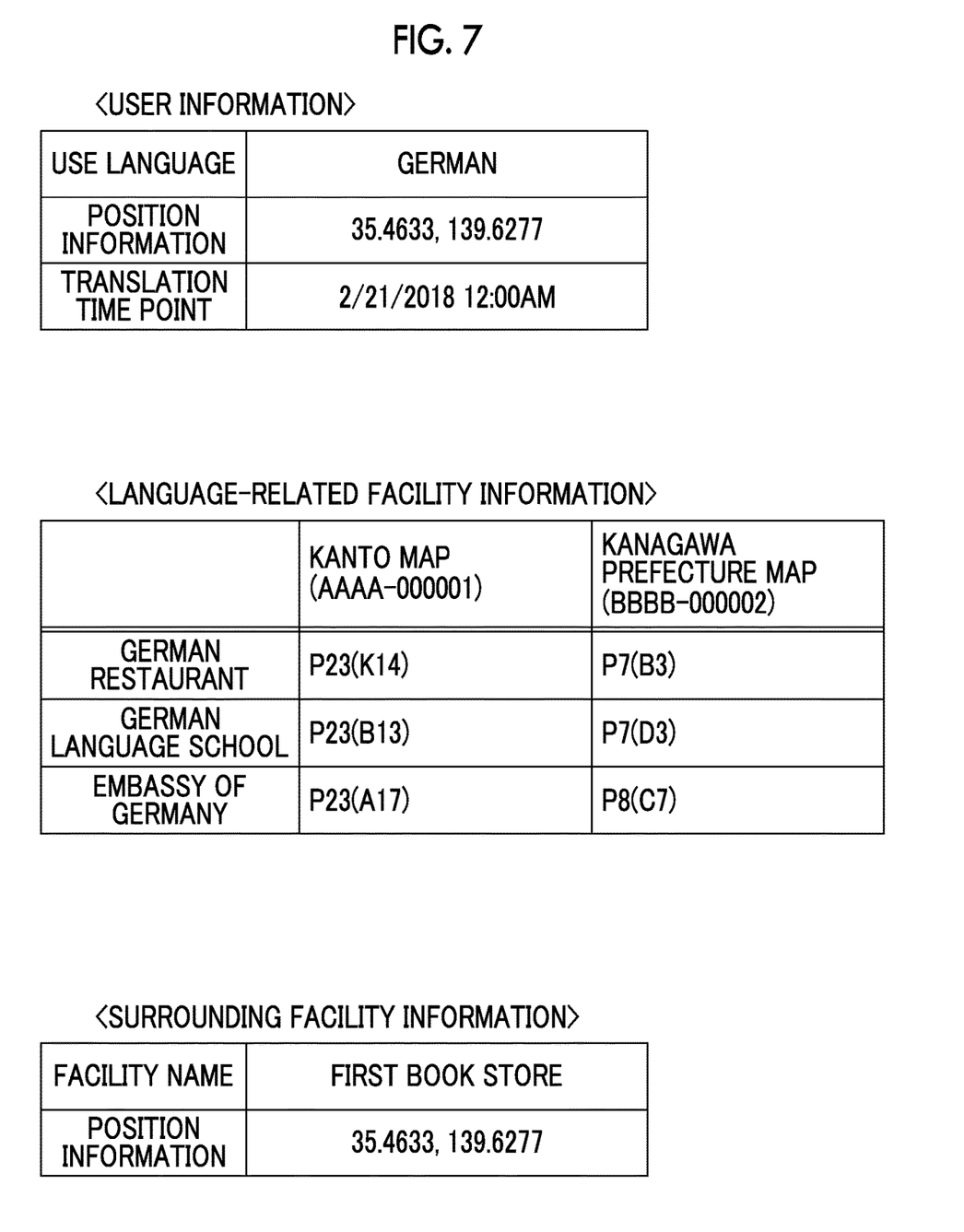
FIG. 7 is a diagram illustrating specific examples of various kinds of information handled by the information providing apparatus.

FIG. 7 is a diagram illustrating specific examples of various kinds of information handled by the information providing apparatus 100. FIG. 7 illustrates specific examples of user information, language-related facility information, and surrounding facility information.

The user information is information regarding the user using the terminal device 200. The user information in the specific example illustrated in FIG. 7 includes a use language, position information, and translation time point. The use language is a language (for example, native language) which is often used by the user using the terminal device 200. For example, the language determination unit 160 in the information providing apparatus 100 determines the use language used by the user of the terminal device 200, from at least one of language setting information obtained from the terminal device 200 or use information of the translation service.

The position information included in the user information is position information regarding the user of the terminal device 200. For example, the current position of the terminal device 200, the position at which the translation service has been used, or the like serves as the position information of the user information. For example, the position information in the user information may be expressed by the longitude and the latitude or may be expressed in a reference coordinate system (for example, a coordinate system including a coordinate axis corresponding to the east-west direction and a coordinate axis corresponding to the north-south direction). The translation time point included in the user information refers to information of a time point at which the user has used the translation service.

The user information may be displayed in the display unit 220 of the terminal device 200. For example, the table of the user information illustrated in FIG. 7 may be displayed in the display unit 220, or a display image based on the contents of the table illustrated in FIG. 7 may be displayed.

The language-related facility information is information regarding a specific facility corresponding to the use language of the user using the terminal device 200. For example, the facility specifying unit 170 in the information providing apparatus 100 sets a facility corresponding to the use language of the user using the terminal device 200 among plural facilities in the vicinity of the position indicated by the position information obtained from the terminal device 200, as the specific facility.

For example, as in the specific example illustrated in FIG. 7, in a case where the use language of the user using the terminal device 200 is German, a German restaurant, a German language school, the embassy of Germany, and the like as facilities corresponding to German among plural facilities in the vicinity of the position indicated by the position information obtained from the terminal device 200 are set as the specific facility.

The information providing apparatus 100 generates language-related facility information indicating post places for positions of the specific facilities on the map of the target publication. In the specific example illustrated in FIG. 7, for each of the German restaurant, the German language school, and the embassy of Germany as the specific facilities, post places of the map in "Kanto map" and "Kanagawa prefecture map" as the target publications are shown by the pages and sections.

The generated language-related facility information is provided for the terminal device 200 from the map information providing unit 140 and is displayed in the display unit 220 of the terminal device 200. For example, the table of the language-related facility information illustrated in FIG. 7 may be displayed in the display unit 220, or a display image based on the contents of the table illustrated in FIG. 7 may be displayed. In a case where the map is allowed to be displayed in the terminal device 200, the positions of the specific facilities may be shown on the displayed map.

For example, the information providing apparatus 100 may provide the terminal device 200 of the user with contact information (telephone number, e-mail address, and the like) of the facility corresponding to the use language of the user. The information providing apparatus 100 may provide the terminal device 200 of the user with position information and the like of a facility in which the publication corresponding to the use language of the user is provided.

The surrounding facility information is information regarding a facility in the vicinity of the position indicated by the position information obtained from the terminal device 200. For example, the information providing apparatus 100 generates surrounding facility information indicating a position of a facility close to the position of the terminal device 200, from plural facilities in the vicinity of the position indicated by the position information obtained from the terminal device 200. For example, surrounding facility information indicating the position of a specific facility (language-related facility) which is the closest to the position indicated by the position information of the terminal device 200 or the position of a facility (book store or the like) in which the target publication is provided, with the longitude and the latitude is generated. For example, the user using the terminal device 200 may easily take the target publication by providing position information of a facility in which the target publication is provided, for the terminal device 200, as the surrounding facility information.

The generated surrounding facility information is provided for the terminal device 200 from the information providing apparatus 100 and is displayed in the display unit 220 of the terminal device 200. For example, the table of the surrounding facility information illustrated in FIG. 7 may be displayed in the display unit 220, or a display image based on the contents of the table illustrated in FIG. 7 may be displayed. In a case where the map is allowed to be displayed in the terminal device 200, the positions of the surround facilities may be shown on the displayed map.

Information (for example, map information in FIG. 3, route information in FIG. 6, or various kinds of information in FIG. 7) supplied from the information providing apparatus 100 may be provided for the terminal device 200, for example, before a communication is cut off due to a disaster. For example, in a case where disaster information such as an urgent earthquake news is obtained, the information providing apparatus 100 may provide the information for the terminal device 200 in accordance with the acquisition of the disaster information. Thus, even in a case where using a communication function of the terminal device 200 is not possible due to the disaster, the user easily uses the map of a publication by referring to the information (for example, map information in FIG. 3, route information in FIG. 6, or various kinds of information in FIG. 7) provided from the information providing apparatus 100 in advance.

Hitherto, the exemplary embodiment of the present invention is described. However, the above-described exemplary embodiment is just an example and is not limited to the scope of the present invention. The present invention encompasses various modifications without departing from the essence thereof.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information providing apparatus comprising:
a communication I/O interface; and
a processor, configured to:
receive position information indicating a current position of a terminal device from the terminal device through the communication I/O interface;
specify a target publication from a plurality of publications on which maps have been posted by comparing a place in which each of the plurality of publications is provided and the position indicated by the position information to each other, wherein the plurality of publications on which maps have been posted are a plurality of printed publications with printed maps;
acquire information regarding a posted map on the target publication;
generate map information indicating where the current position is described on the posted map of the target publication based on the acquired information; and
transmit the generated map information to the terminal device through the communication I/O interface.

2. The information providing apparatus according to claim 1,
wherein the map information further comprises information indicating a post place of the current position of the terminal device indicated by the position information on the map of the target publication.

3. The information providing apparatus according to claim 2,
wherein the map information further comprises route information which sequentially indicates post places corresponding to a route from the current position of the terminal device indicated by the position information to a destination on the map of the target publication.

4. The information providing apparatus according to claim 3, wherein the processor is further configured to:
determine a use language to be used by a user of the terminal device from at least one of language setting information of the terminal device or use information of a translation service;
specify a specific facility corresponding to the use language according to the current position of the terminal device,
wherein the map information further comprises information indicating the specific facility on the map of the target publication.

5. The information providing apparatus according to claim 2, wherein the processor is further configured to:
determine a use language to be used by a user of the terminal device from at least one of language setting information of the terminal device or use information of a translation service;
specify a specific facility corresponding to the use language according to the current position of the terminal device,
wherein the map information further comprises information indicating the specific facility on the map of the target publication.

6. The information providing apparatus according to claim 1,
wherein the map information further comprises route information which sequentially indicates post places corresponding to a route from the current position of the terminal device indicated by the position information to a destination on the map of the target publication.

7. The information providing apparatus according to claim 6, wherein the processor is further configured to:
determine a use language to be used by a user of the terminal device from at least one of language setting information of the terminal device or use information of a translation service;
specify a specific facility corresponding to the use language according to the current position of the terminal device, wherein the map information further comprises information indicating the specific facility on the map of the target publication.

8. The information providing apparatus according to claim 1, wherein the processor is further configured to:
determine a use language to be used by a user of the terminal device from at least one of language setting information of the terminal device or use information of a translation service;
specify a point of interest corresponding to the use language according to the current position of the terminal device,
wherein the map information further comprises information indicating the point of interest on the map of the target publication.

9. The information providing apparatus according to claim 1,
wherein the map information indicates on which page of the target publication the current position is described.

10. An information providing system comprising:
a terminal device used by a user; and
an information providing apparatus that transmits information to the terminal device,
wherein the terminal device includes a first communication I/O interface and a first processor, and wherein the first processor is configured to:
transmit position information indicating a current position of the terminal device to the information providing apparatus through the first communication I/O interface, and
display the information transmitted from the information providing apparatus through the first communication I/O interface, and
the information providing apparatus includes a second communication I/O interface and a second processor, and wherein the second processor is configured to:
receive the position information indicating the current position of the terminal device from the terminal device through the second communication I/O interface,
specify a target publication from a plurality of publications on which maps have been posted by comparing a place in which each of the plurality of publications is provided and the position indicated by the position information to each other, wherein the plurality of publications on which maps have been posted are a plurality of printed publications with printed maps,
acquire information regarding a posted map on the target publication,
generate map information indicating where the current position is described on the posted map of the target publication based on the acquired information, and
transmit the generated map information to the terminal device through the second communication I/O interface.

11. A non-transitory computer readable medium storing a program causing a computer having a communication I/O interface to:
receive position information indicating a current position of a terminal device from the terminal device through the communication I/O interface;
specify a target publication from a plurality of publications on which maps have been posted by comparing a place in which each of the plurality of publications is provided and the position indicated by the position information to each other, wherein the plurality of publications on which maps have been posted are a plurality of printed publications with printed maps;
acquire information regarding a posted map on the target publication;
generate map information indicating where the current position is described on the posted map of the target publication based on the acquire information; and
transmit the generated map information to the terminal device through the communication I/O interface.

* * * * *